(12) United States Patent
Koat et al.

(10) Patent No.: US 10,684,877 B2
(45) Date of Patent: Jun. 16, 2020

(54) VIRTUALIZED CUSTOMER PREMISES EQUIPMENT

(71) Applicant: INCOGNITO SOFTWARE SYSTEMS INC., Vancouver (CA)

(72) Inventors: Peter Koat, Vancouver (CA); Andre Kostur, Vancouver (CA); Christopher Busch, Arnprior (CA); Stephane Bourque, Vancouver (CA)

(73) Assignee: INCOGNITO SOFTWARE SYSTEMS INC., Vancouver (CA)

( * ) Notice: Subject to any disclaimer, the term of this patent is extended or adjusted under 35 U.S.C. 154(b) by 0 days.

(21) Appl. No.: 14/985,012

(22) Filed: Dec. 30, 2015

(65) Prior Publication Data

US 2017/0192806 A1    Jul. 6, 2017

(51) Int. Cl.
*G06F 9/455* (2018.01)
*H04L 12/24* (2006.01)
*H04L 12/28* (2006.01)
*H04L 12/66* (2006.01)
*H04L 29/08* (2006.01)

(52) U.S. Cl.
CPC ...... *G06F 9/45558* (2013.01); *H04L 12/2801* (2013.01); *H04L 12/66* (2013.01); *H04L 41/08* (2013.01); *H04L 41/18* (2013.01); *H04L 67/10* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| 2013/0259061 | A1* | 10/2013 | Aoshima | H04L 12/66 370/401 |
| 2014/0082219 | A1* | 3/2014 | Karaoguz | G06Q 20/10 709/246 |
| 2016/0164914 | A1* | 6/2016 | Madhav | H04L 63/20 726/1 |
| 2016/0353353 | A1* | 12/2016 | Sung | H04L 12/66 |
| 2016/0360415 | A1* | 12/2016 | Dorfman | H04W 12/08 |
| 2017/0070365 | A1* | 3/2017 | Varmani | H04L 12/66 |
| 2017/0310655 | A1* | 10/2017 | Sethi | H04L 12/4633 |

\* cited by examiner

*Primary Examiner* — Charlie Sun
(74) *Attorney, Agent, or Firm* — Elan IP Inc.

(57) ABSTRACT

A method for providing functionality to customer premises equipment including detecting one or more customer premises connected to a wide area network (WAN), wherein each customer premises includes a plurality of customer premises equipment (CPE) devices, a local area network (LAN) connecting each of the CPE devices, and an external network communications device for connecting the LAN to the WAN; virtualizing each CPE device from each customer premises to define a plurality of vCPE devices; and providing functionality to the CPE devices via respective vCPE devices. A system for implementing the method is also disclosed.

9 Claims, 7 Drawing Sheets

VIRTUALIZED CUSTOMER PREMISES EQUIPMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The invention relates generally to the field of networked customer premises equipment, and more particularly to a method and system for providing virtualized customer premises equipment.

BACKGROUND OF THE INVENTION

Customer premises equipment (CPE) refers generally to any device or equipment located at a subscribers premises and connected with a service provider's communications network. Generally, the CPE is also connected to a local area network at the customer premises and is network connected in some form or another. For example, CPE devices could include telephones, routers, switches, gateways, cable set-top boxes, networking adaptors, Wi-Fi access points, and internet access gateways.

CPE devices have grown more and more sophisticated over the years, evolving from an Ethernet access device to advanced gateway devices with Wi-Fi capabilities, multiple network ports, firewall, and DHCP capabilities, for example. Development in the art is also fast moving and there are routinely new CPEs released which support existing and new capabilities. For practical and business reasons, legacy devices are not upgraded, in part due to their inability to support the corresponding increased demands in computing power and memory that the new capabilities require. In some instances, new functionality is added to supported CPEs through firmware upgrades if the device is able to support it and there are sound business reasons for adding capabilities to non-end-of-life devices. Each of the CPEs in one premises are typically connected to one or more gateways, which then interface with the exterior communications network.

There is also a trend in the communications art known as network function virtualization which aims to virtualize networked services that were previously provided by proprietary CPE hardware device firmware features, in effect seeking to decouple hardware from software. This is often implemented by providing a software stack augmented to provide the same level of functionality that the traditional hardware device could deliver. Such hardware devices typically had this functionality programmed on an ASIC or embedded in a system-on-a-chip stack. The software stack would then be required to run on a common off the shelf system, which in turn could be virtualized in a cloud environment to thus provide the virtualized networked service.

There are several strategies in the prior art which propose supporting network function virtualization for CPE devices. One approach is to continue with the modern gateway but to inject arbitrary executable code remotely on the gateway without having to deploy a new firmware image. However, this approach has its challenges, including the requirement that the gateway would need to be updated with the ability to execute arbitrary code, which would need to be accomplished via a new firmware that would need to be deployed. Another difficulty arises from the fact that there are several system on a chip manufacturers providing the framework for most CPEs, with varying architectures, meaning that unless there is a common virtual runtime environment that is leveraged, it could be quite cumbersome to provide the same functionality to all CPEs at a service provider especially if there are more than a few different device types and models.

There is accordingly a need in the art for an improved system and/or method to virtualize certain functions of CPE devices to improve upon the limitations brought forth by having legacy CPE devices at a customer premises.

SUMMARY OF THE INVENTION

In one embodiment of the invention, there is provided a method for providing functionality to customer premises equipment including detecting one or more customer premises connected to a wide area network (WAN), wherein each customer premises includes a plurality of customer premises equipment (CPE) devices, a local area network (LAN) connecting each of the CPE devices, and an external network communications device for connecting the LAN to the WAN; virtualizing each CPE device from each customer premises to define a plurality of vCPE devices; and providing functionality to the CPE devices via respective vCPE devices.

In one aspect of the invention, the method further includes creating a unique customer portal for each the vCPE device whereby a user at a customer premises can manage the functionality provided to a respective CPE device via a corresponding vCPE device.

In another aspect of the invention, each the vCPE device disjoins network functionality from a corresponding CPE device and provides the disjoined network functionality via a software equivalent provided by the vCPE device.

In another aspect of the invention, the vCPE is implemented as a virtual machine executed remotely from the customer premises.

In another aspect of the invention, the vCPE is implemented on a gateway device proximate to the customer premises.

In another aspect of the invention, providing the functionality comprises providing one or more selected from the group consisting of provisioning a firewall, port forwarding, dynamic host configuration protocols, rate shaping, service and domain filtering, malware filtering, DLNA, cloud storage and quality of service determinations.

In another aspect of the invention, the method further includes intercepting by the vCPE all customer data traffic originating from the CPE devices while maintaining isolation of subscriber traffic and computing processes.

In another aspect of the invention, the vCPE is implemented as a computing module in a cloud environment and maintains the isolation of subscriber traffic and computing processes by processing all layer 2 traffic via an L2VPN.

In another aspect of the invention, the network communications device is a cable modem and the method is implemented in a DOCSIS network.

In another aspect of the invention, the functionality is transmitted to the CPE devices over the WAN and over the LAN within header information of subscriber data traffic.

In another embodiment of the invention, there is provided a residential cable network system for providing functionality to customer premises equipment including one or more customer premises connected to a wide area network (WAN), wherein each customer premises includes a plurality of customer premises equipment (CPE) devices, a local area network (LAN) connecting each of the CPE devices, and an external network communications device for connecting the LAN to the WAN; a computer system including a computer processor executing computer readable instructions stored on a computer readable medium for implementing virtual machine virtualizing each CPE device from each customer premises to define a plurality of vCPE devices; the computer system further providing functionality to the CPE devices via respective vCPE devices.

In one aspect of the second embodiment invention, there is provided a unique customer portal accessible via a computer system at a customer premises for each the vCPE device whereby a user at a customer premises can manage the functionality provided to a respective CPE device via a corresponding vCPE device.

In another aspect of the second embodiment, each vCPE device disjoins network functionality from a corresponding CPE device and provides the disjoined network functionality via a software equivalent provided by the vCPE device.

In another aspect of the second embodiment, the vCPE is implemented as a virtual machine executed remotely from the customer premises.

In another aspect of the second embodiment, there is provided a gateway device proximate to the customer premises on which the vCPE is implemented.

In another aspect of the second embodiment, the functionality comprises providing one or more selected from the group consisting of provisioning a firewall, port forwarding, dynamic host configuration protocols, rate shaping, service and domain filtering, malware filtering, DLNA, cloud storage and quality of service determinations.

In another aspect of the second embodiment, the vCPE intercepts all customer data traffic originating from the CPE devices while maintaining isolation of subscriber traffic and computing processes.

In another aspect of the second embodiment, the computer system includes a computing module in a cloud environment for implementing the vCPE and the vCPE and maintains the isolation of subscriber traffic and computing processes by processing all layer 2 traffic via an L2VPN.

In another aspect of the second embodiment, the network communications device is a cable modem forming part of a DOCSIS network.

In another aspect of the second embodiment, the functionality is transmitted to the CPE devices over the WAN and over the LAN within header information of subscriber data traffic.

BRIEF DESCRIPTION OF THE DRAWINGS

Embodiments will now be described, by way of example only, with reference to the attached Figures, wherein.

DETAILED DESCRIPTION OF THE EMBODIMENTS

Herein, numerous specific details are set forth in order to provide a thorough understanding of the exemplary embodiments described. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as presented here for illustration.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

The Virtualized Customer Premises Equipment (vCPE) platform as herein described generally orchestrates the encapsulation of subscriber traffic originating from CPE client devices across operator network facilities, and terminates this traffic within a computing element located within the operator network while maintaining isolation of both subscriber traffic and computing processes. Within the vCPE computing element, client Internet Protocol (IP) services are provided through independent service functions to which the vCPE traffic is subscribed.

Embodiments described herein generally relate to a method and system for providing a virtualized customer premise equipment (vCPE) device which disjoins the network functionality from hardware elements of each individual CPE device into a software equivalent capable of running on commercial off-the-shelf equipment; typically a computer system or server accessible on a "cloud" basis via the Internet, or a Network Function Virtualization network computing appliance for example.

Figure 1:
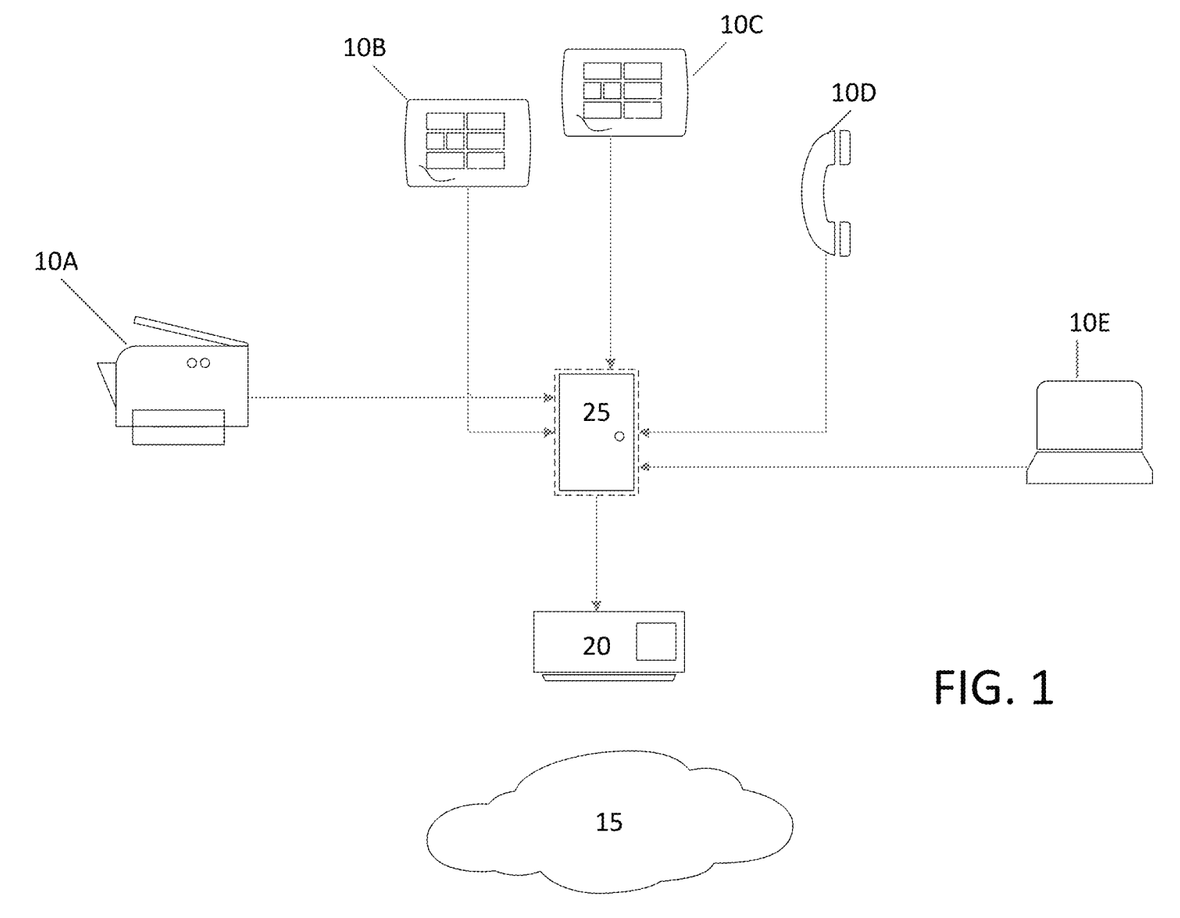
FIG. 1 shows a general customer premises to which one embodiment of the invention is applied.

Referring now to FIG. 1, there is shown a plurality of CPE devices 10A-10E, at the physical location of a customer. Each of the CPE devices 10A-10E is in communication with the external communications network 15 via a gateway 20. A virtual CPE (vCPE) 25 is implemented in software between the CPE devices 10A-10E and the gateway 20, preferably on an off-the-shelf computer system in such a way to permit the vCPE 25 to read all inbound and outbound data transfer from the CPE devices 10A-10E to the gateway. In another embodiment described further below, the vCPE is implemented into an enhanced gateway device. In this manner, all data traffic is routed through the intermediary vCPE 25. It is also contemplated that the vCPE could be entirely implemented on a cloud server, as described below with respect to FIG. 3. In this disclosure, the terms "intermediary vCPE" and "vCPE" are used interchangeably. The modifier "intermediary" is used for clarity only, and to emphasis in certain contexts that the vCPE is positioned between the CPE devices and the gateway; however, it is understood that the vCPE is generally arranged in this manner.

The intermediary vCPE provides a cloud, or otherwise networked intermediary, which becomes privy to all data communication between the CPE devices 10A-10E. Based on the software implemented via the vCPE, various network or other functions can be implemented and rolled out at a pace desired by the operator of the vCPE. The vCPE could also be entirely hardware agnostic, to the point that regardless of the age or capabilities of any individual CPE device, functionality can be provided by the vCPE that influences the manner in which the individual CPE device interact with other CPE devices or with the external network. For example, a firewall may be implemented at the vCPE level which each of the individual CPE devices would then be subject to, regardless of whether or not these individual CPE devices have firewall capabilities or are compatible with firewalls in general.

The software-implemented vCPE will thus be able to perform, or otherwise provide, a multitude of network functions, including but not limited to the provisioning of firewalls, port forwarding, DHCP (dynamic host configuration protocols), Quality of Service (QoS) determinations, and other standard network functions known in the art. In addition, a software-implemented vCPE as herein described may also provide advanced capabilities related to per user and/or per device data such as user/device counters, time blocking, quotas and rate shaping. Prior art gateways are unable to provide these advanced capabilities or they are overly cost prohibitive. In particular, the memory and storage requirements necessary to provide per user and/or per device tracking are impractical in a prior art gateway device.

In the preferred embodiment, the vCPE is implemented are a compute module in a computing cloud environment, processing all layer 2 traffic via an L2VPN, such as those defined by 801.1ad and 802.1ah-2008. The vCPE instance examines payload headers providing such services as DHCP provisioning, firewall, service and domain filtering, rate shaping, QoS prioritization, malware filtering, DLNA, cloud storage and intrusion detection. These virtualized functions are implemented in software within the vCPE cloud storage space, and within the vCPE compute module—as opposed to in software contained within the gateway. A micro kernel is implemented to establish separation between the processing and flow of network data and payloads for each subscriber. This micro kernel could be implemented within a container such as a larger compute instance, although other implementations are also possible.

Alternatively, implementing the vCPE on an off-the-shelf computer system or using a Network Function Virtualization computing appliance between the gateway and the CPEs provides a cost-effective and practical way of virtualizing the aforementioned functions on a platform where storage, network interface and computing power are not limiting constraints. This is particularly useful in residential applications, for example, where implementing the vCPE in this manner would be agnostic to the residential user in terms of the need to have additional hardware installed or other intrusions into the home, while still providing the capabilities herein described.

In order to route data traffic through the intermediary vCPE, tagging and encapsulation methodologies are used. These may include 802.1ah (MACinMAC), 802.1Q (VLAN), 802.1ad (QinQ), GRE/NVGRE, VXLAN (rfc-7348), DOVE (Distributed Overlay Virtual Ethernet), MPLS and MPLSoGRE. These methodologies allow for the tunneling of Ethernet frames over layers 3 or 4, the network or transport layers. It is also contemplated that multiple encapsulation methodologies could be used to bridge the adoption rate of the various approaches.

Figure 2:
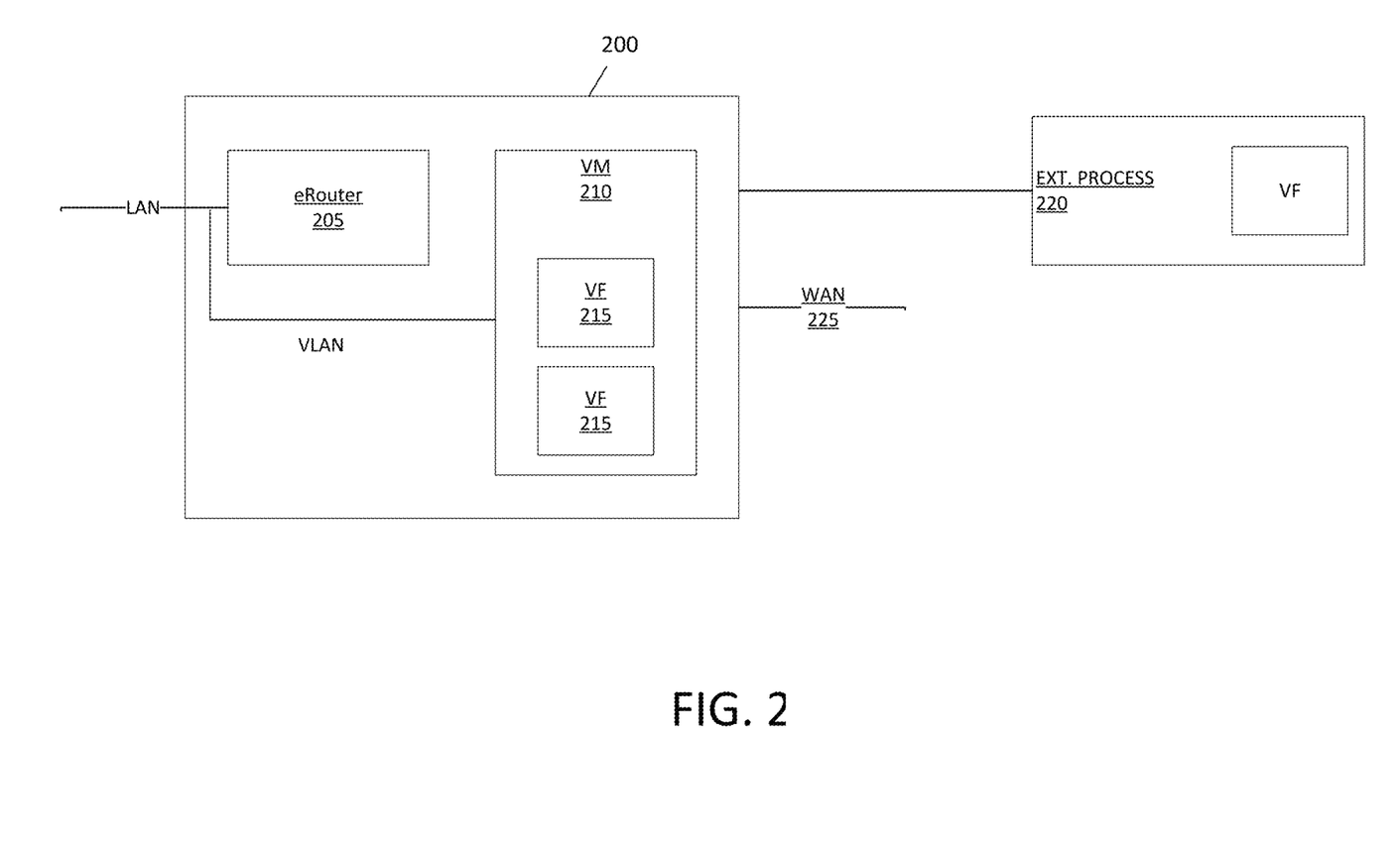
FIG. 2 shows one exemplary system for implementing the vCPE of the invention.

There are two main approaches for virtualizing network functions on a CPE gateway. In one embodiment shown in FIG. 2, a purpose built gateway 200 provides eRouter 205 functionality and enables a service provider (SP) to inject arbitrary bytecode to the gateway 200 in order for that programmatic code to be executed thereby augmenting the functionality without requiring a new firmware image. The bytecode is interjected via cloud platform 220, which sends external processes and functions to the gateway 200. A virtual machine 210 within the gateway 200 executes virtual functions 215 and is connected to the local area network prior to its interfacing with the eRouter 205. The gateway 200 interacts with the wide area network (WAN) 225 in a manner as is known in the prior art.

Figure 3:
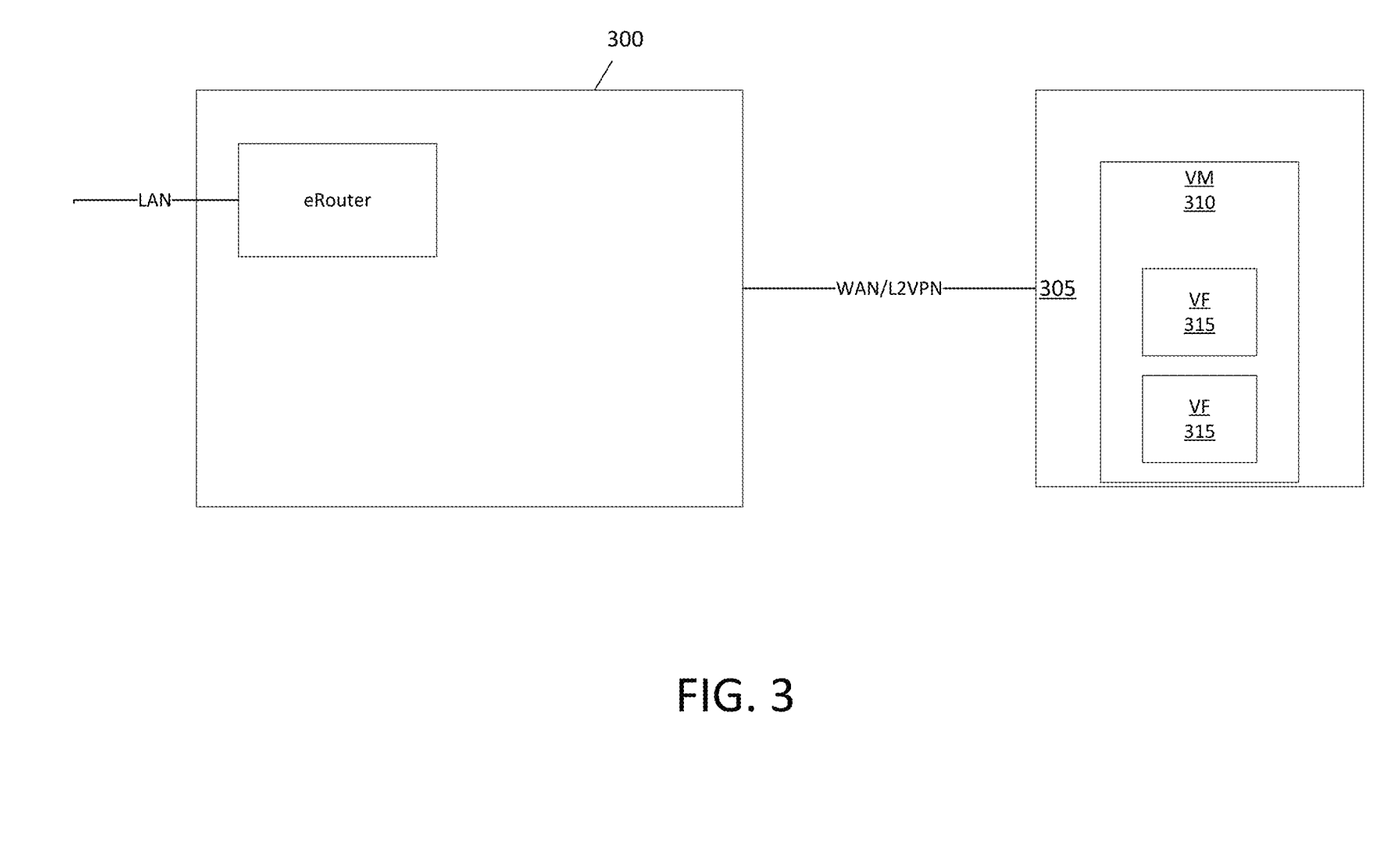
FIG. 3 shows another exemplary system for implementing the vCPE of the invention.

In another embodiment shown in FIG. 3, the gateway 300 acts as a layer 2 bridge, offloading all packet processing to a virtualized instance within the SP cloud 305. With this approach, the virtualized instance would process the payload stream adjusting the input and output network traffic in response to parallel or serially executed packet processing resulting via virtual machine 310 executing virtual functions 315 to provide the functionality described herein. The embodiment of FIG. 3 is the preferred approach.

Figure 4:
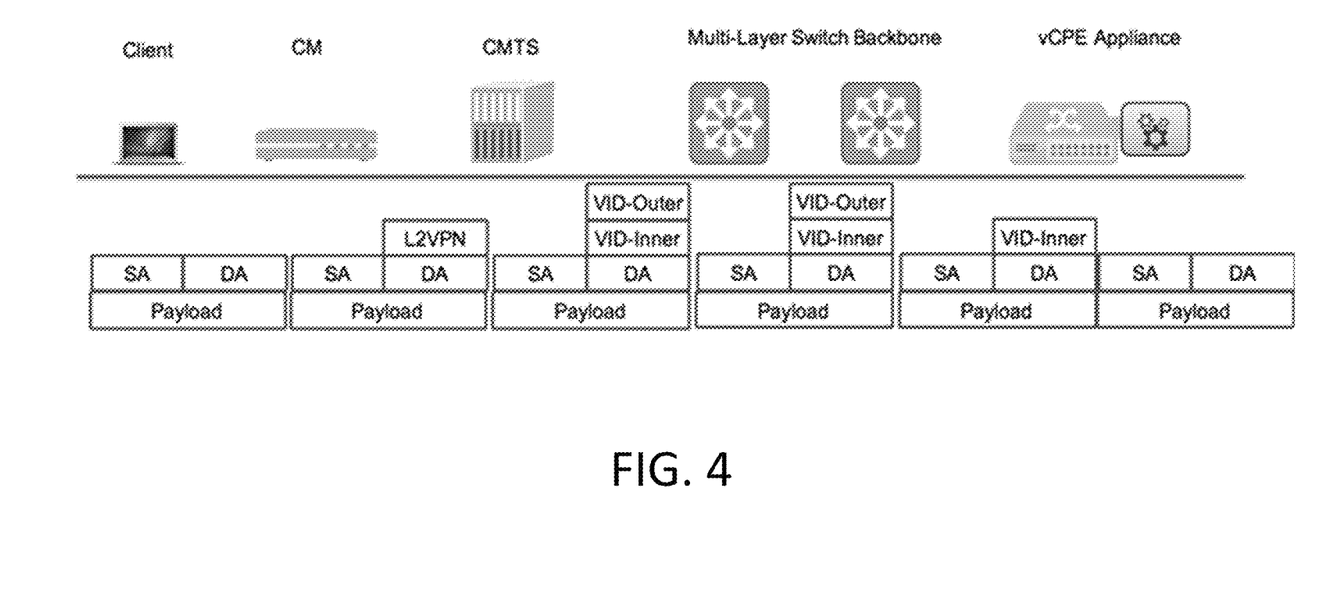
FIG. 4 shows elements of a DOCSIS network to which the invention may be applied and the flow of data within the DOCSIS network.

The first issue addressed relates to encapsulating subscriber cable modem traffic and de-encapsulating this traffic at the cable modem termination system. One exemplary manner for implementing this in a DOCSIS network (such as the CableLabs DOCSIS network) is shown in FIG. 4. Specifications in current standards exist permitting the encapsulation of cable modem traffic. When traffic occurs on the network, the frame to be forwarded contains the data known as the payload, originating from a source address (SA), for transmission to a destination address (DA). Encapsulation is established through co-ordination of payload header values within both the Cable Modem (CM), and the Cable Modem Termination System (CMTS). Within the CableLabs DOCSIS standard, a mechanism for Layer 2 Virtual Private Network (L2VPN) exists. The use of L2VPN in a DOCSIS network enables a CM device, when provisioned, to identify a service flow as a unique network path. When so provisioned, all traffic payloads are framed by the CM with a header value containing a unique identifier. In this example applying L2VPN to the IEEE 802.1Q Virtual LAN standard, the service flow when terminated by CMTS will be converted to an Ethernet frame where the presence of a DOCSIS L2VPN header is replaced for a matching value in IEEE802.1Q VLAN inner tag. At this stage, all subscriber traffic is now isolated from the CPE local area network, across the access distribution network, and presented to the operator aggregation network as a unique payload to the network. Other ways of implementing this functionality are contemplated as well, and the aforementioned is described as an example illustrative of implementation within existing network standards.

The delivery of subscriber traffic to the vCPE engine, virtual machine or network appliance itself does not provide the desired services itself. At this stage, only subscriber traffic has been isolated and presented as is to the vCPE virtual machine. Upon receiving traffic from the network, the vCPE associates an incoming payload encapsulated with a unique header value in the network to a vCPE unique subscriber identifier. For each vCPE subscriber, a subscription of service functions exists to describe the treatment of IP services and access to applications served from the operator cloud. As noted, various methods exist to encapsulate subscriber cable modem traffic and to de-encapsulate this traffic at the cable modem termination system through a variety of payload header values used to identify when a service flow is mapped to an 802.1Q VLAN, or an MPLS pseudo-wire, or when a payload is to be encapsulated within a Generic Routing Encapsulation (GRE) tunnel.

At this stage, the vCPE virtual machine is the first hop gateway for all subscriber client devices attached as local area network (LAN) clients within a customers' premises. From the vCPE virtual machine, applications servicing subscriber client devices may now be provisioned.

The first such example is delivering a common customer care web portal enabling subscriber self-care support regardless of the physical underlying CPE device. A preferred way of achieving this functionality makes use of a unique web portal for each vCPE subscriber terminated at the vCPE engine. For each incoming request made by a client device to the local web service, for example using a web browser to connect with the LAN gateway IP. These sessions are re-written to map client requests of LAN gateway IP and port these to a vCPE web service IP, and port based on the vCPE subscriber unique identifier.

Figure 5:
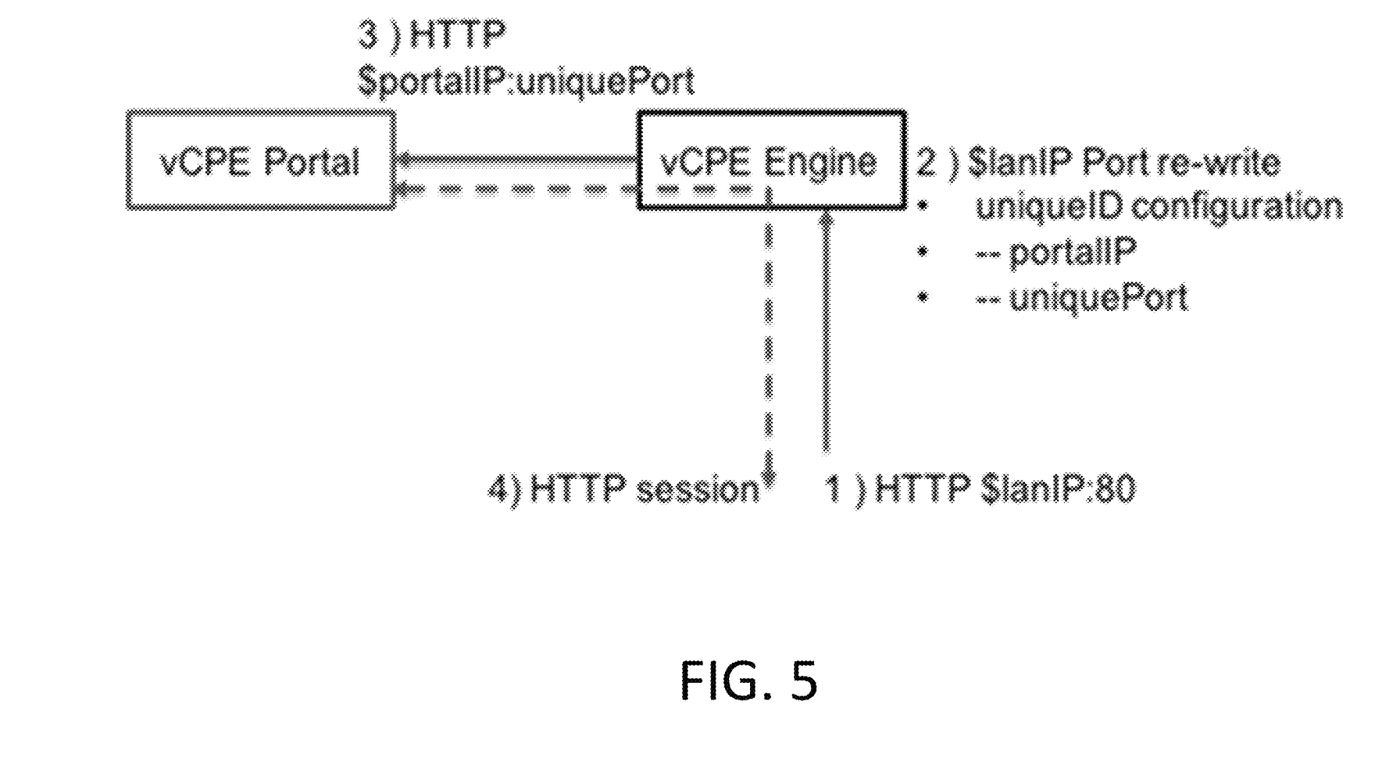
FIG. 5 shows an implementation of customer portal for using functionality provided by the vCPE.
Figure 6:
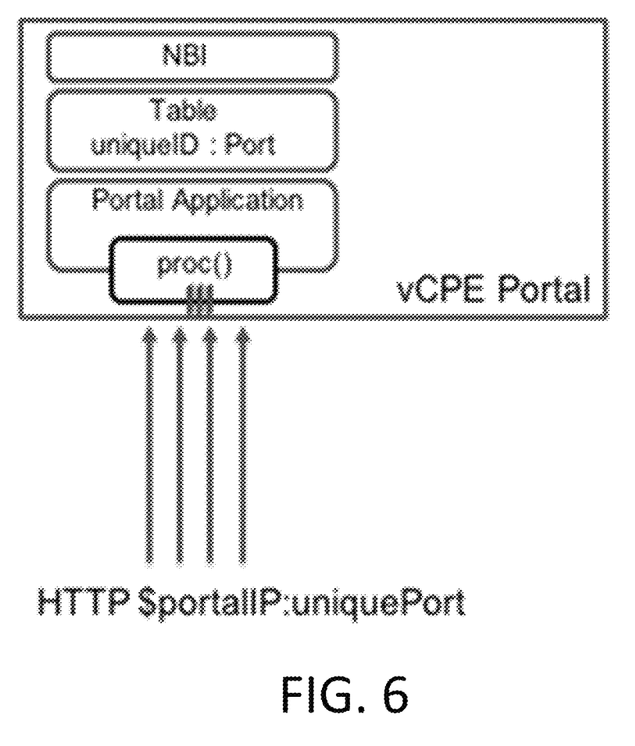
FIG. 6 is a detail view of the customer portal of FIG. 5.

As shown in FIG. 5, when an incoming HTTP (hypertext transport protocol) session arrives at the vCPE portal, the incoming port will be treated as unique to a subscriber. Therefore, the vCPE portal application operates with an interface listening to a unique IP port for each vCPE subscriber. The relationship of subscriber unique identifier to IP ports are stored in a lookup table, within the vCPE portal, as shown in FIG. 6.

In order to build a number of applications that may be subscribed to as service functions beyond the functions provided by the vCPE application itself, the transmission of client payload through additional applications is necessary. These applications may or may not exist within the same computing element as the vCPE application.

Figure 7:
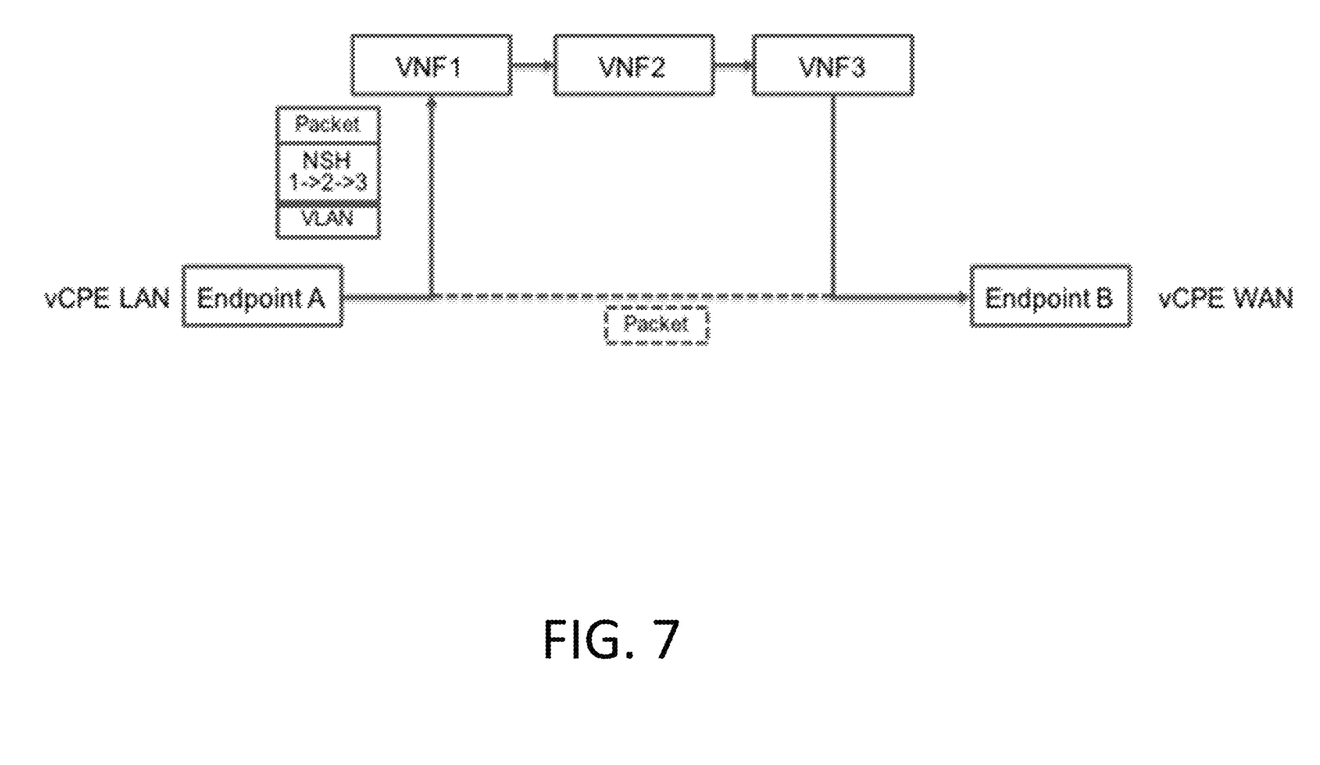
FIG. 7 is a representative drawing shown the transfer of virtual functions between a LAN and a WAN according to the invention.

Similarly to the encapsulation of initial subscriber traffic over the access network, payload header information is added to describe Service Function Chain (SFC) identifiers referred to in the prior art as Network Service Headers (NSH) which enables a Forwarding Graph (FG) to be established when the payload will traverse as it is being processed in the Network Function Virtualization Infrastructure (NFVI) compute domain. FIG. 7 illustrates this functionality, where a plurality of Virtual Network Functions (VNF1, VNF2, VNF3) are transmitted in header data between the LAN at a customer premises and the WAN operated by the service provider.

In practice, a multi-function device could also be provided to each customer, which includes hardware, having computing capabilities provided by a computer processor, which executes virtualized software installed on a computer readable medium. This implementation has the advantages of providing a vendor agnostic implementation with a common functional software stack, thereby eliminating or dramatically reducing the need to roll out any updates to any of the CPEs. In addition, the operator of the multi-function device has control over creating and deploying new software capabilities to any and all gateways. Virtualized functionality provided in such a manner is also entirely scalable providing cost savings and ease of use for implementation of future functionality.

The multi-function device serves as a form of advanced gateway and may include one or more of the following capabilities: multiple wireless radios, remote diagnostics, and may include a software stack for the gateway being virtualized, including software capabilities of DHCP, time blocking and CPE usage statistics.

The instant invention also permits for the creation of a unique customer portal for each virtualized customer premises device, and is dynamically instantiated when a new virtual customer premises subscriber device is added to the network.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A method for providing functionality to customer premises equipment comprising:
    detecting one or more customer premises connected to a wide area network (WAN), wherein each customer premises includes a plurality of customer premises equipment (CPE) devices, a local area network (LAN) connecting each of said plurality of customer premises equipment (CPE) devices, and an external network communications device for connecting the LAN to the WAN;
    virtualizing the each of said CPE devices from each customer premises from the one or more customer premises to define a plurality of vCPE devices;

implementing each vCPE device in software as a compute module in a computing cloud environment, within which compute module a micro kernel is implemented to establish separation between the processing and flow of network data and payloads for each subscriber; and providing functionality to said CPE devices via respective vCPE devices;

wherein each said vCPE device disjoins network functionality from a corresponding CPE device and provides said disjoined network functionality via a software equivalent provided by said vCPE device.

2. The method according to claim 1, further comprising creating a unique customer portal for each said vCPE device whereby a user at a customer premise from the one or more customer premises can manage said functionality provided to a respective CPE device from said CPE devices via a corresponding vCPE device from the plurality of vCPE devices.

3. The method according to claim 1, wherein said vCPE is implemented as a virtual machine executed remotely from said customer premises.

4. The method according to claim 1, wherein said vCPE is implemented on a gateway device proximate to said customer premises.

5. The method of claim 1, wherein providing said functionality comprises providing one or more selected from the group consisting of provisioning a firewall, port forwarding, dynamic host configuration protocols, rate shaping, service and domain filtering, malware filtering, DLNA, cloud storage and quality of service determinations.

6. The method of claim 1, further comprising intercepting by said vCPE all customer data traffic originating from said CPE devices while maintaining isolation of subscriber traffic and computing processes.

7. The method of claim 6, wherein said vCPE is implemented as a computing module in a cloud environment and maintains said isolation of subscriber traffic and computing processes by processing all layer 2 traffic via an L2VPN.

8. The method of claim 1, wherein said network communications device is a cable modem and the method is implemented in a DOCSIS network.

9. The method of claim 1, wherein said functionality is transmitted to said CPE devices over said WAN and over said LAN within header information of subscriber data traffic.

\* \* \* \* \*